United States Patent [19]

Kotera et al.

[11] 4,180,330
[45] Dec. 25, 1979

[54] METHOD OF AND A SYSTEM FOR COLOR SEPARATION

[75] Inventors: Hiroaki Kotera; Hiroyoshi Tsuchiya; Ryuzo Itabashi; Kunio Yoshida; Tsutomu Shibata; Yukifumi Tsuda; Yoshimitsu Kanno; Heijiro Hayami; Haruko Sugita, all of Kawasaki, Japan

[73] Assignee: Matsushita Electric Industrial Co., Ltd., Kadoma, Japan

[21] Appl. No.: 798,010

[22] Filed: May 18, 1977

[30] Foreign Application Priority Data

May 19, 1976 [JP] Japan .................................. 51/58369

[51] Int. Cl.$^2$ ............................ G01J 3/46; H04N 1/46
[52] U.S. Cl. .................................... 356/425; 250/578; 356/416
[58] Field of Search ...................... 250/226; 355/4, 32; 356/74, 173, 175, 184, 186, 189, 193, 195; 358/76, 80; 178/15

[56] References Cited

U.S. PATENT DOCUMENTS

| | | | |
|---|---|---|---|
| 3,578,976 | 5/1971 | Schunack | 250/226 X |
| 3,604,840 | 9/1971 | Sharp | 356/173 X |
| 3,720,779 | 3/1973 | Schunack | 358/78 |
| 3,834,817 | 9/1974 | Vinneman et al. | 356/189 X |
| 3,942,154 | 3/1976 | Akami et al. | 250/226 X |
| 4,090,243 | 5/1978 | Kotera et al. | 356/402 |

Primary Examiner—John K. Corbin
Assistant Examiner—Bruce Y. Arnold
Attorney, Agent, or Firm—Lowe, King, Price & Becker

[57] ABSTRACT

Light beams scans patterns of a subject copy, being reflected therefrom, and being converted into pulsating electrical signals. Color borders between two different colored patterns are detected based on the pulsating signals. On the other hand, a color of a predetermined scanned line following each of the color borders is sensed for determining the sensed color as a color between the adjacent color borders.

8 Claims, 54 Drawing Figures

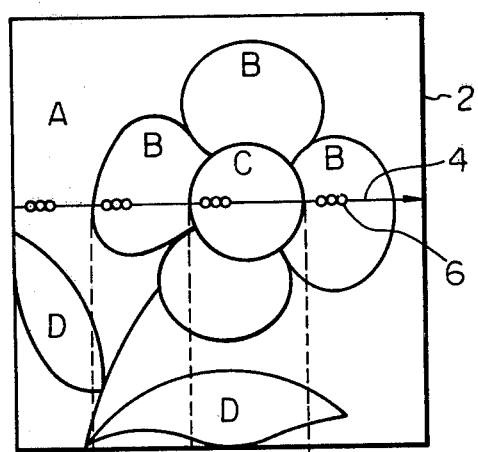
Fig. 2a
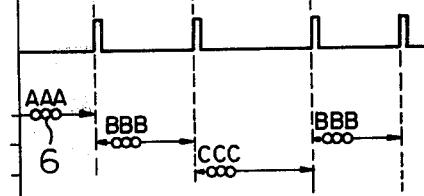
Fig. 2b
Fig. 2c
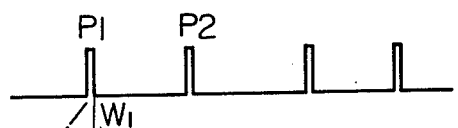
Fig. 5a
Fig. 5b
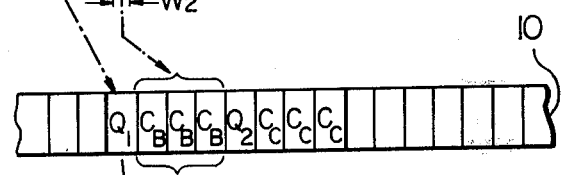
Fig. 5c
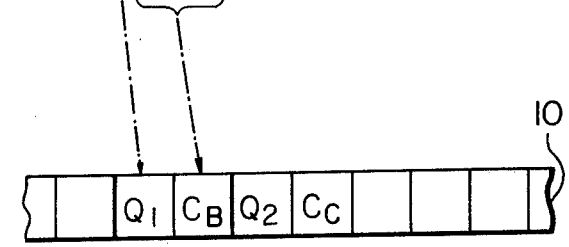
Fig. 5d

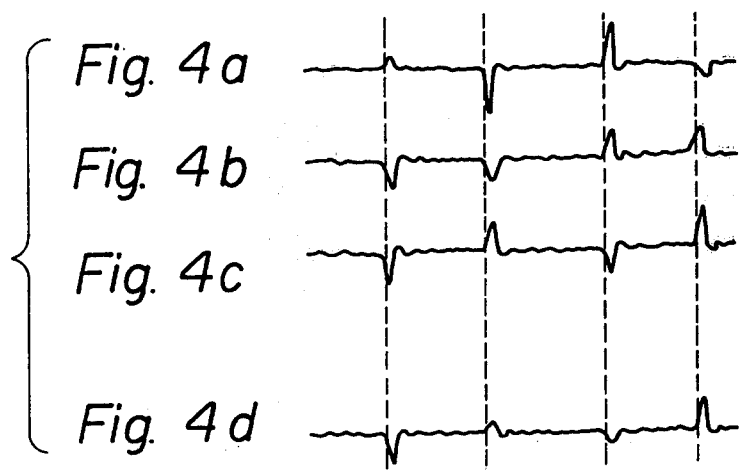
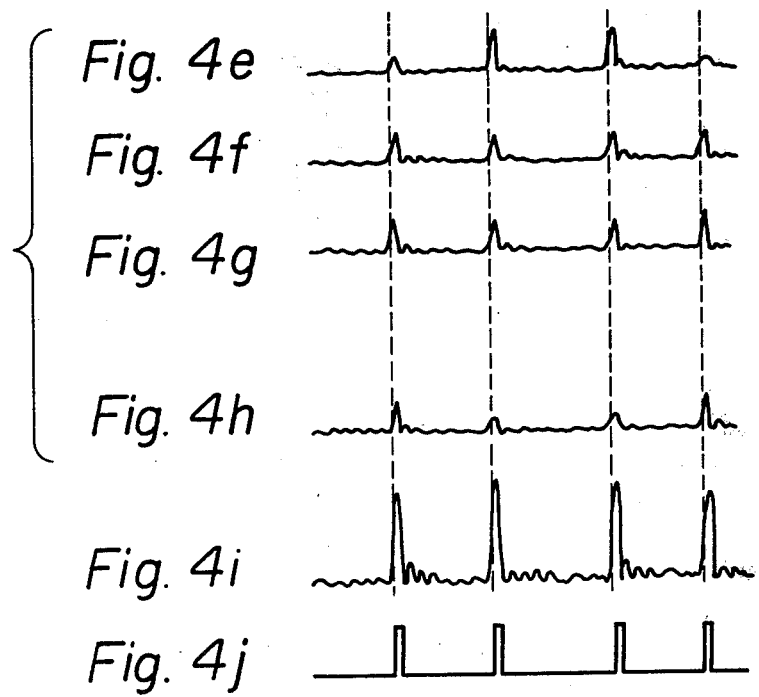

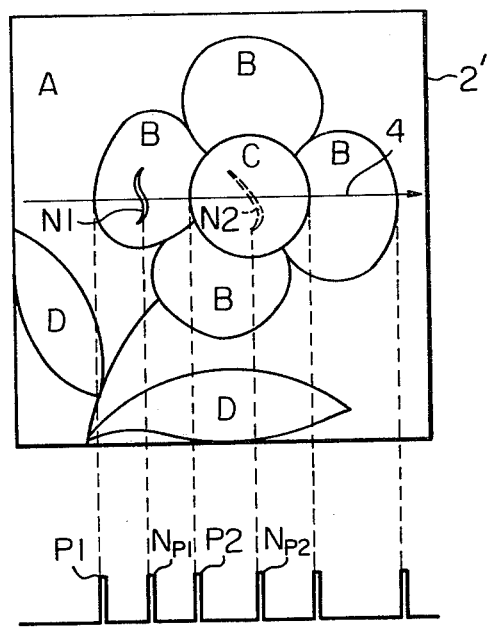
Fig. 6a
Fig. 6b
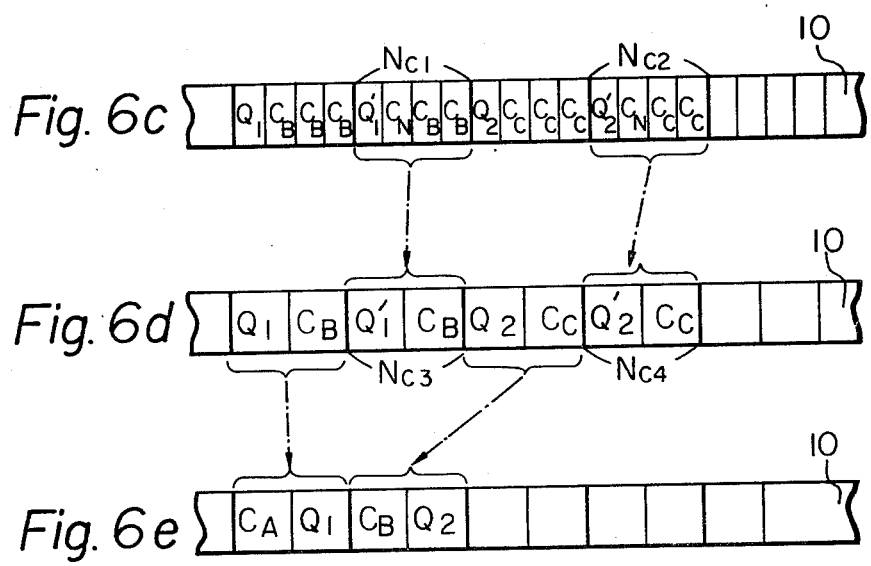
Fig. 6c
Fig. 6d
Fig. 6e

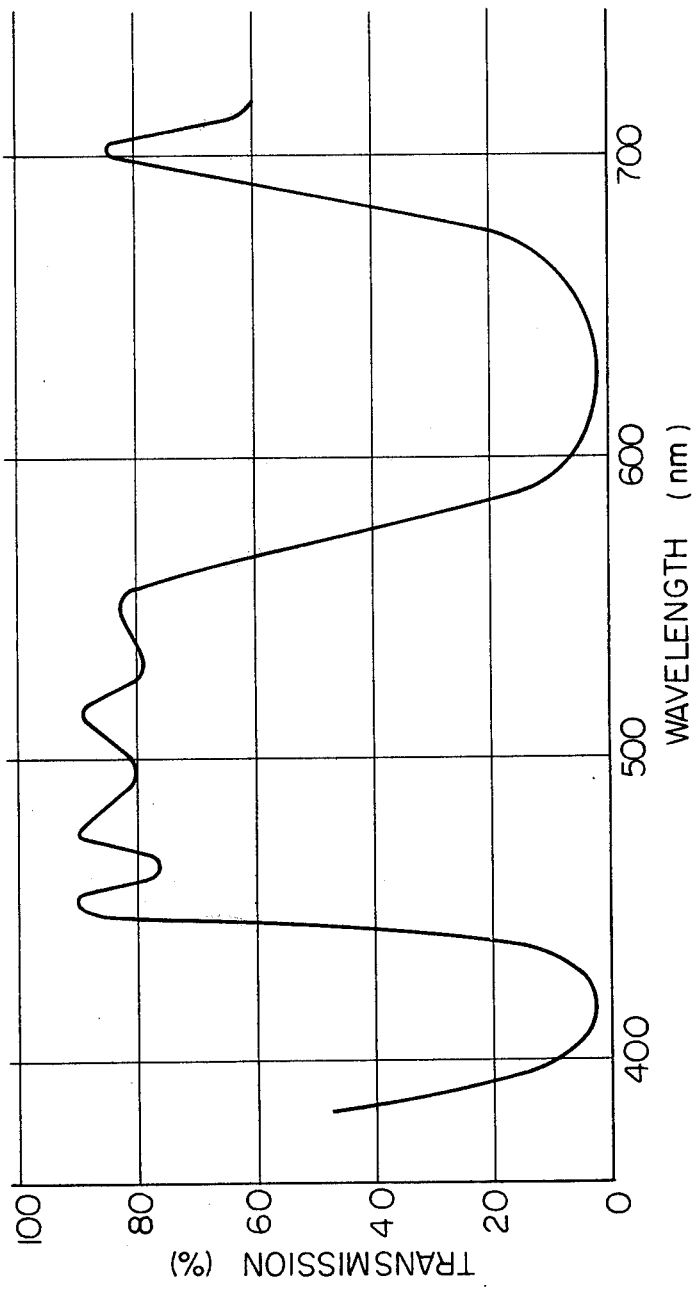

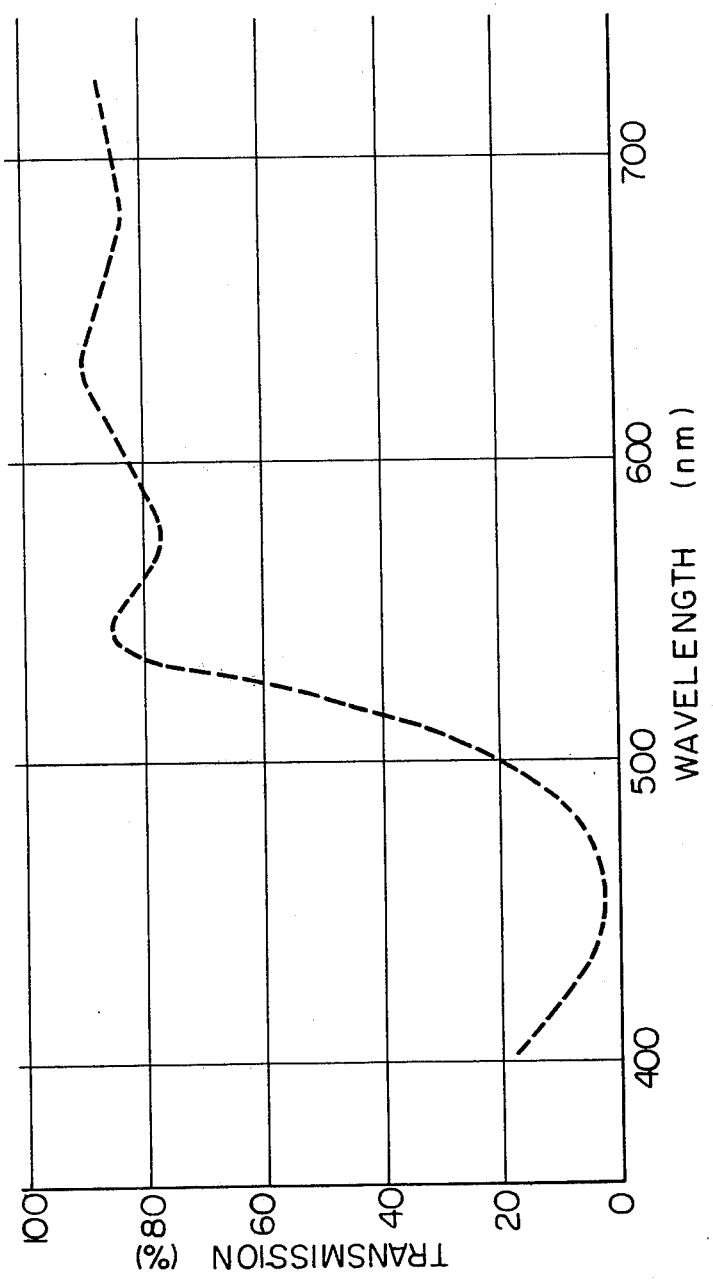

METHOD OF AND A SYSTEM FOR COLOR SEPARATION

The present invention relates to a method of and a system for color separation of colored patterns on a subject copy for obtaining monochromes, and also relates to improved components for use in such a method and a system.

Several methods and systems have been proposed for the purpose of the above mentioned color separation, but none have proven to be practically desirable in that the conventional ones are complicated in structure, slow in processing, and do not ensure exact separation.

In the following, prior to discussion of the present invention, one of the conventional methods will be discussed in connection with the accompanying drawings, viz., FIGS. 1a and 1b for better understanding of the present invention. Suitable scanning means (not shown) scans across a colored subject copy 2 along a line 4 with an arrow head. The subject copy 2, in this case, includes four different colors denoted by reference characters "A", "B", "C", and "D". A plurality of small circles 6 each is a picture element representative of a color. Light beams, which are reflected from the subject copy and include color information, are separated with respect to spectra in suitable color separating means (not shown), and are then employed to produce monochromes such as 8a, 8b, and 8c as shown in FIG. 1b. In the above discussed method, however, the color determination of each picture element should be done seriatim one by one, so that considerably much time is required to determine the color of each of the picture elements, since it is often the case that the number of picture elements reaches $10^7$–$10^8$.

It is therefore a primary object of the present invention to remove the above mentioned defect inherent in the prior art.

Another object of the present invention is to provide a method of effectively separating colors of colored patterns on a subject copy by improved steps.

Another object of the present invention is to provide a system for readily separating colors of colored patterns on a subject copy by an improved arrangement of task steps.

Still another object of the present invention is to provide improved color filters for use in both the method and the system embodying the present invention.

These and other objects, features, and many of the attendant advantages of this invention will be appreciated more readily as the invention becomes better understood by the following detailed description, taken with the accompanying drawings, wherein like parts in each of the several figures are identified by the same reference characters, and wherein:

FIGS. 2a-2c illustrate a principle of a first preferred embodiment of the present invention;

FIGS. 3a-5d illustrate a method of the first preferred embodiment;

FIGS. 6a-6e illustrate a modification of the method of the first preferred embodiment;

Figure 12:
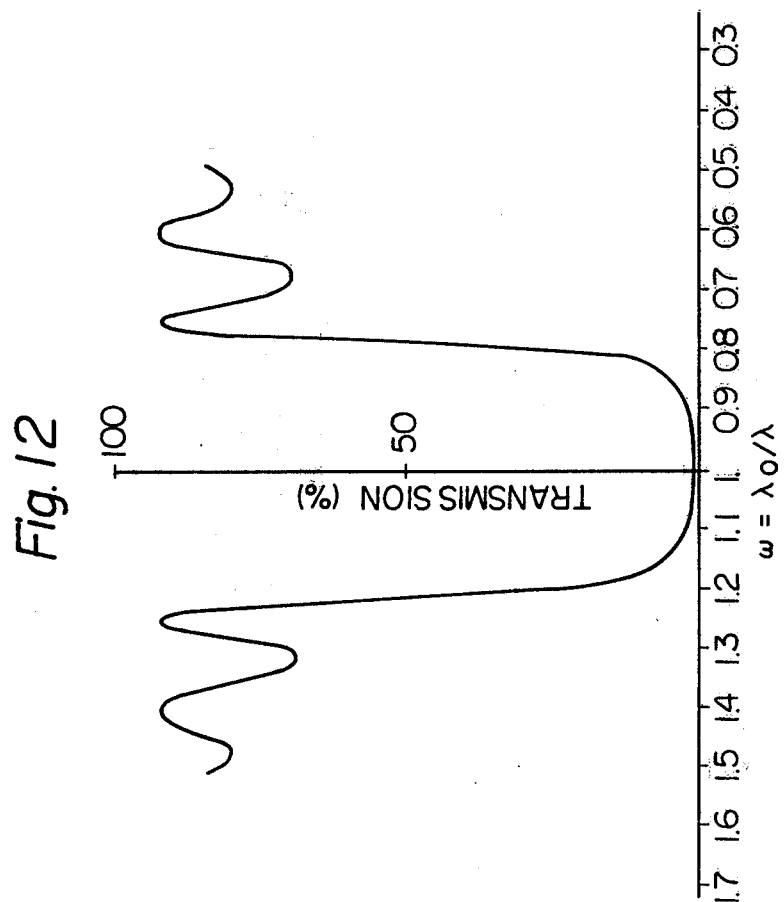
Figure 13:
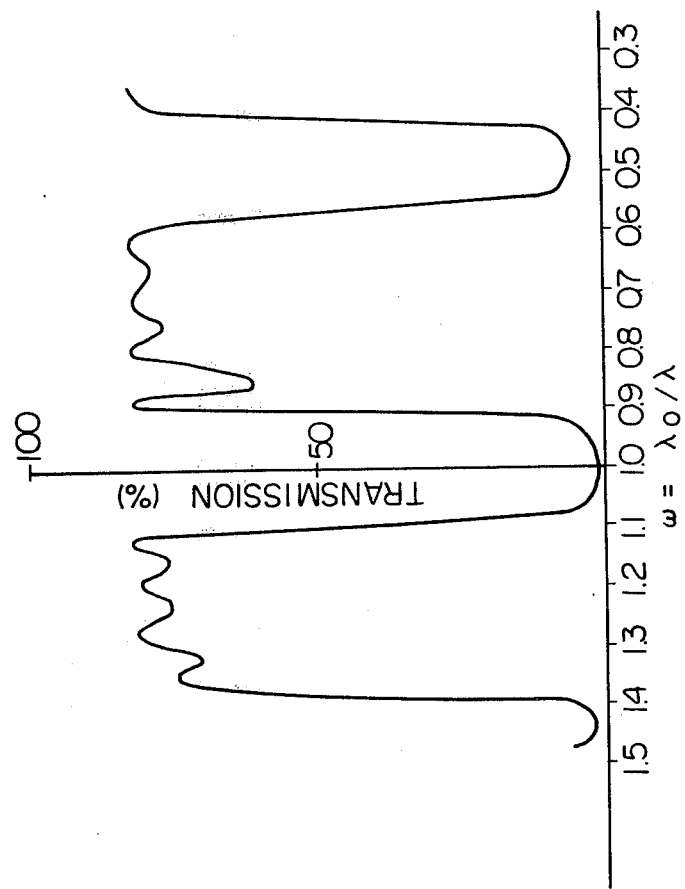
Figure 14:
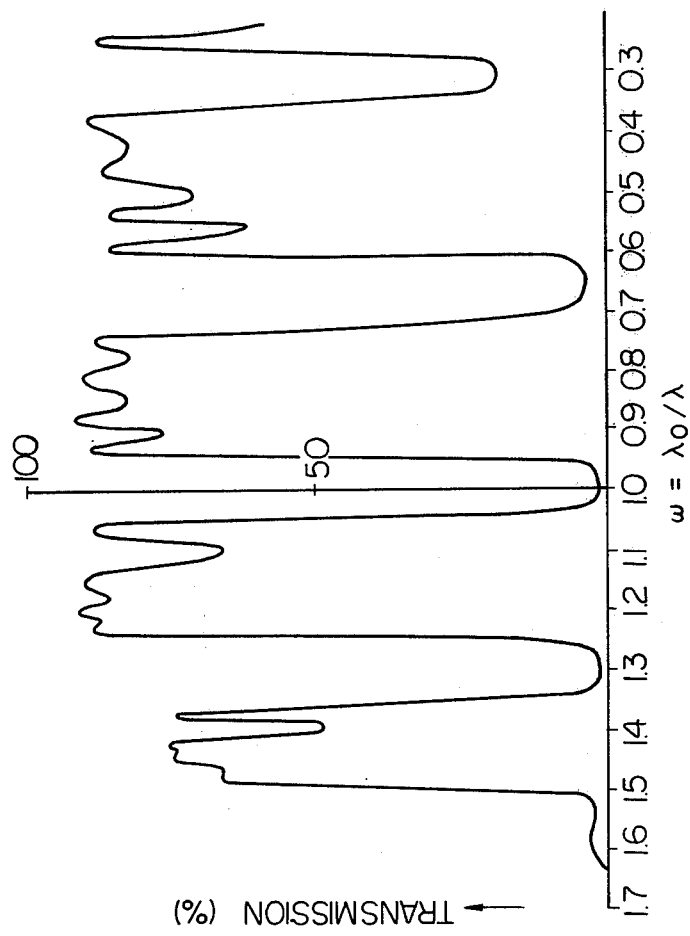
Figure 15:
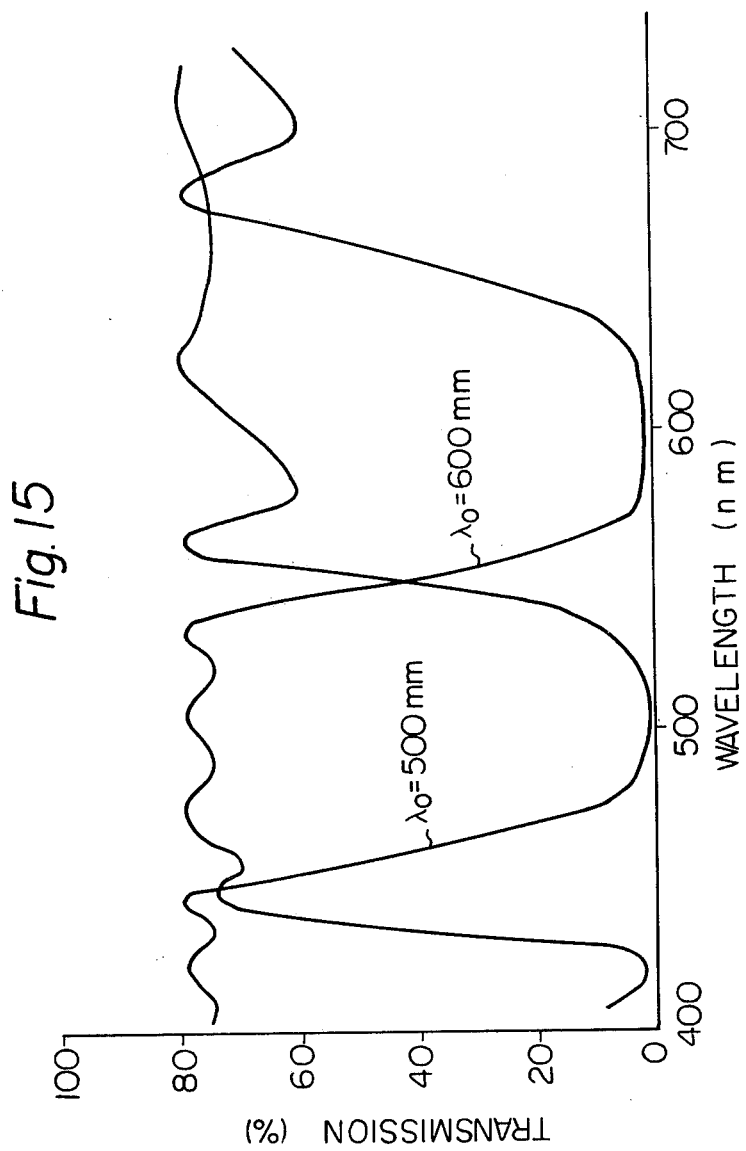
Figure 16:
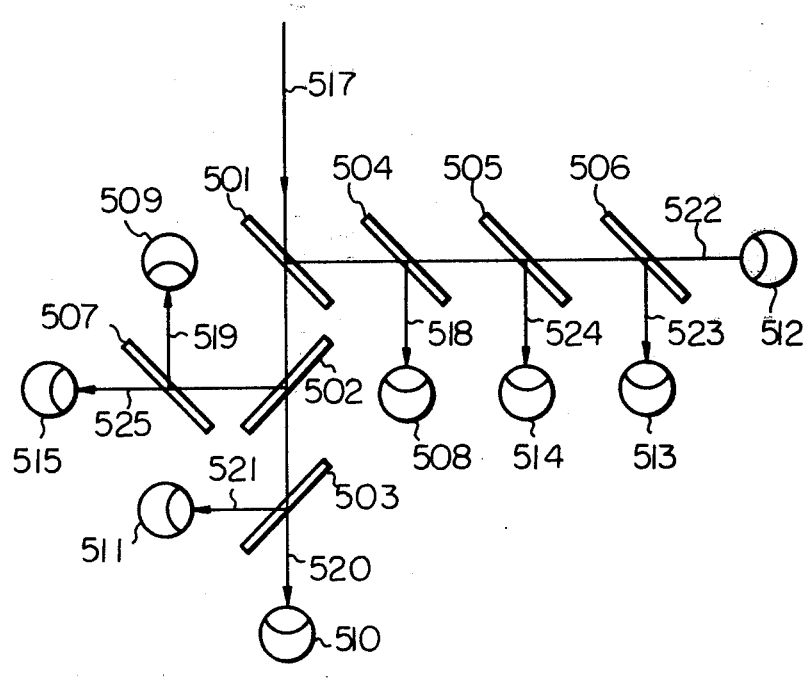
Figure 17B:
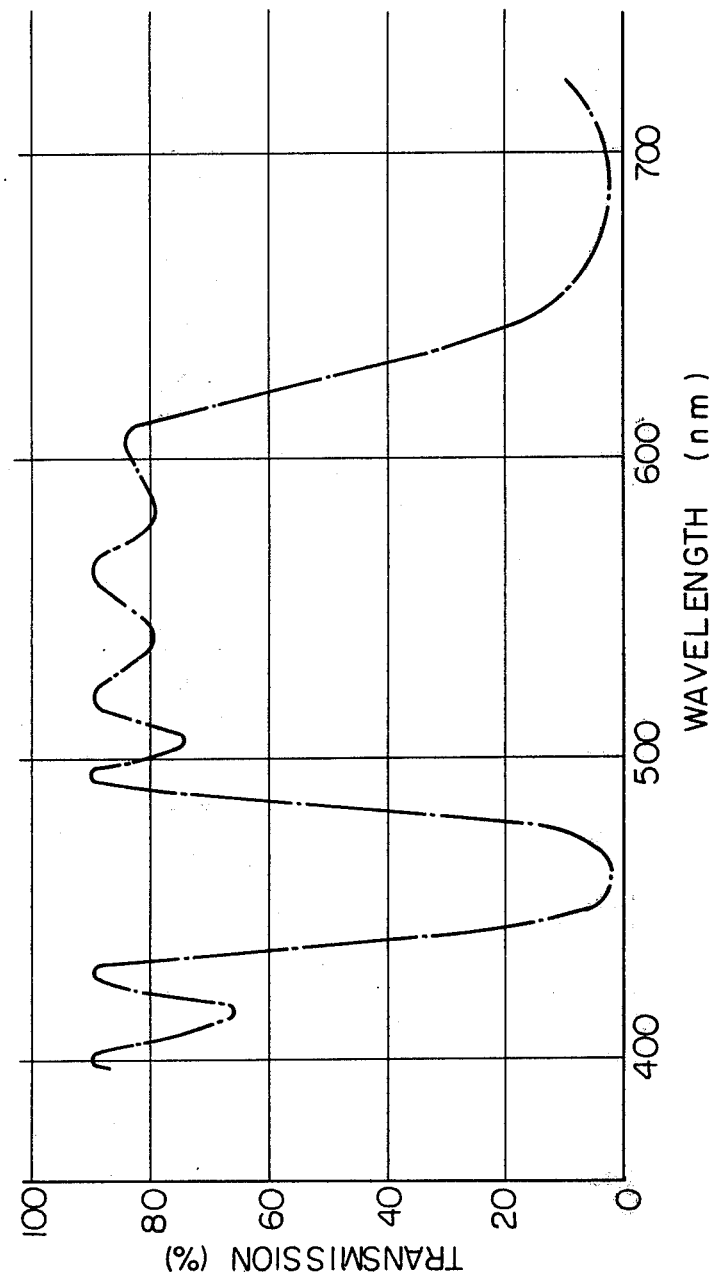
Figure 17C:
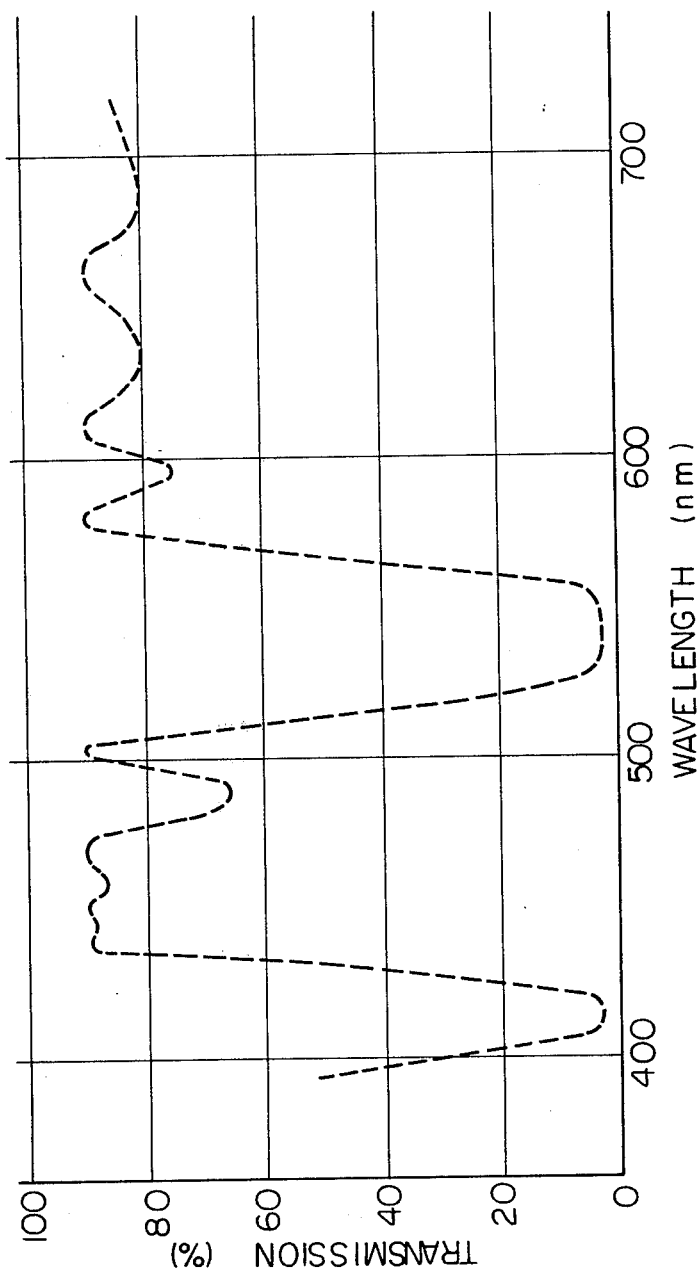
Figure 17D:
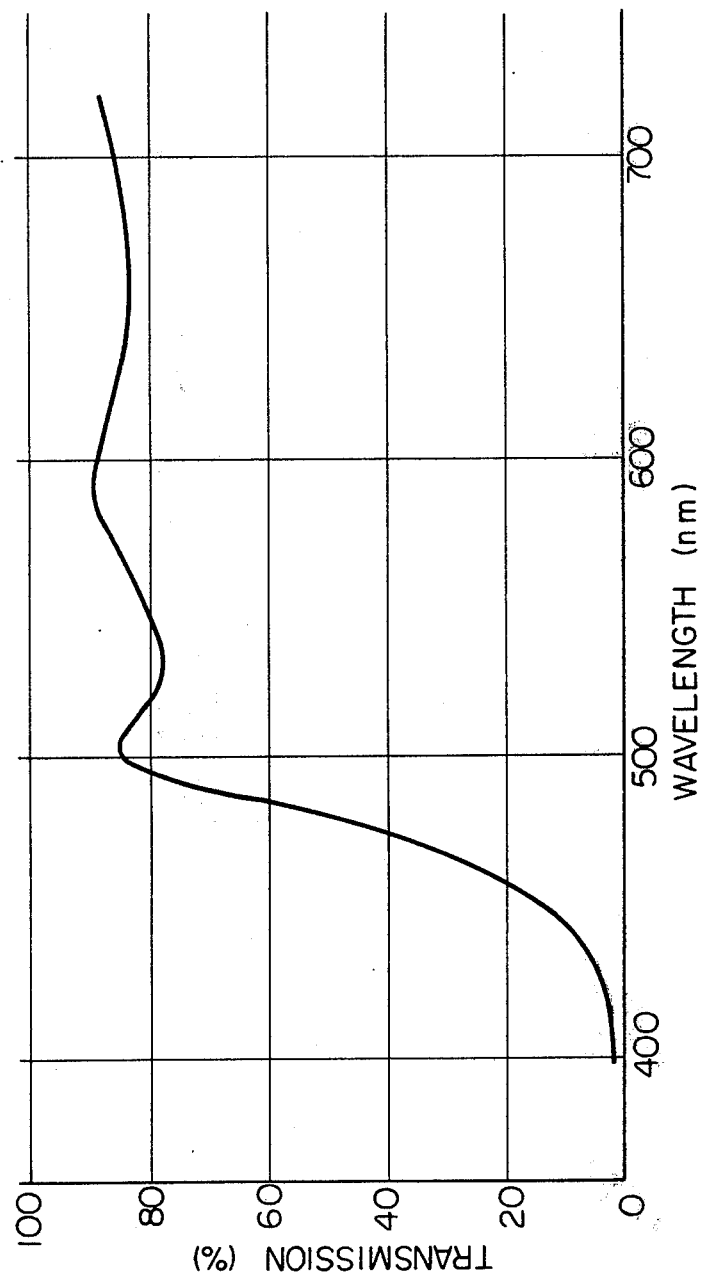
Figure 17E:
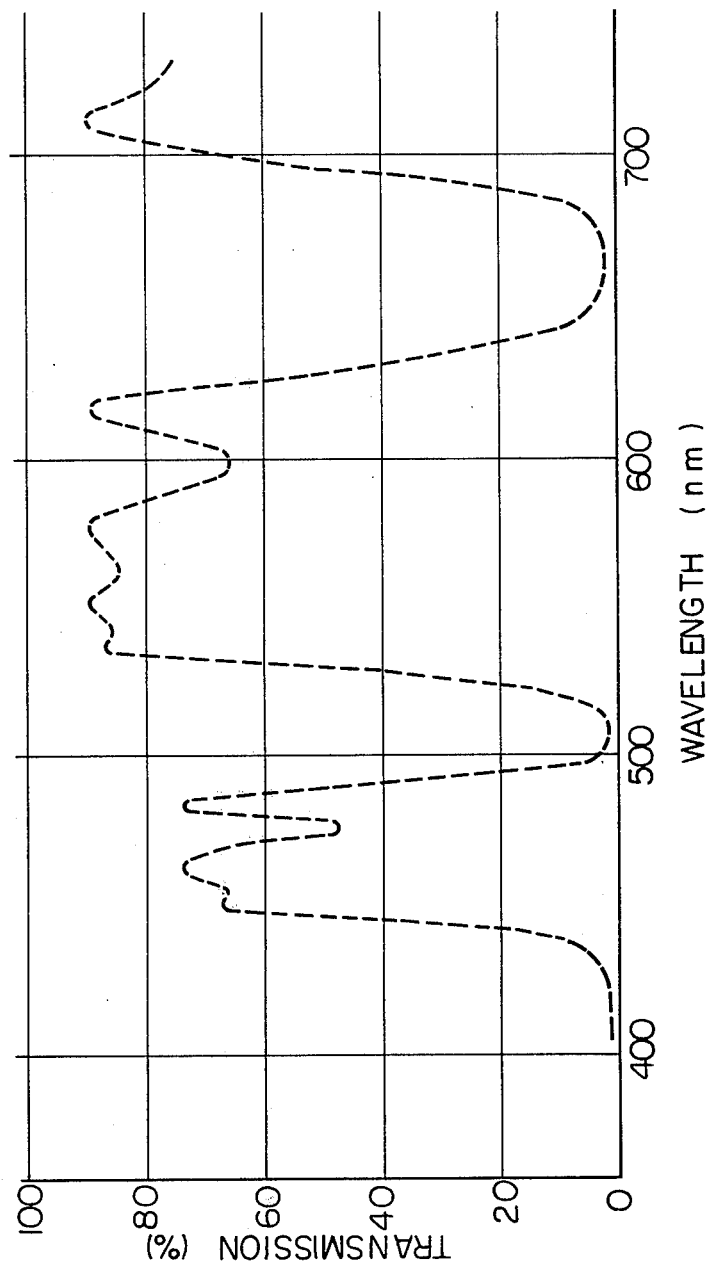
Figure 17F:
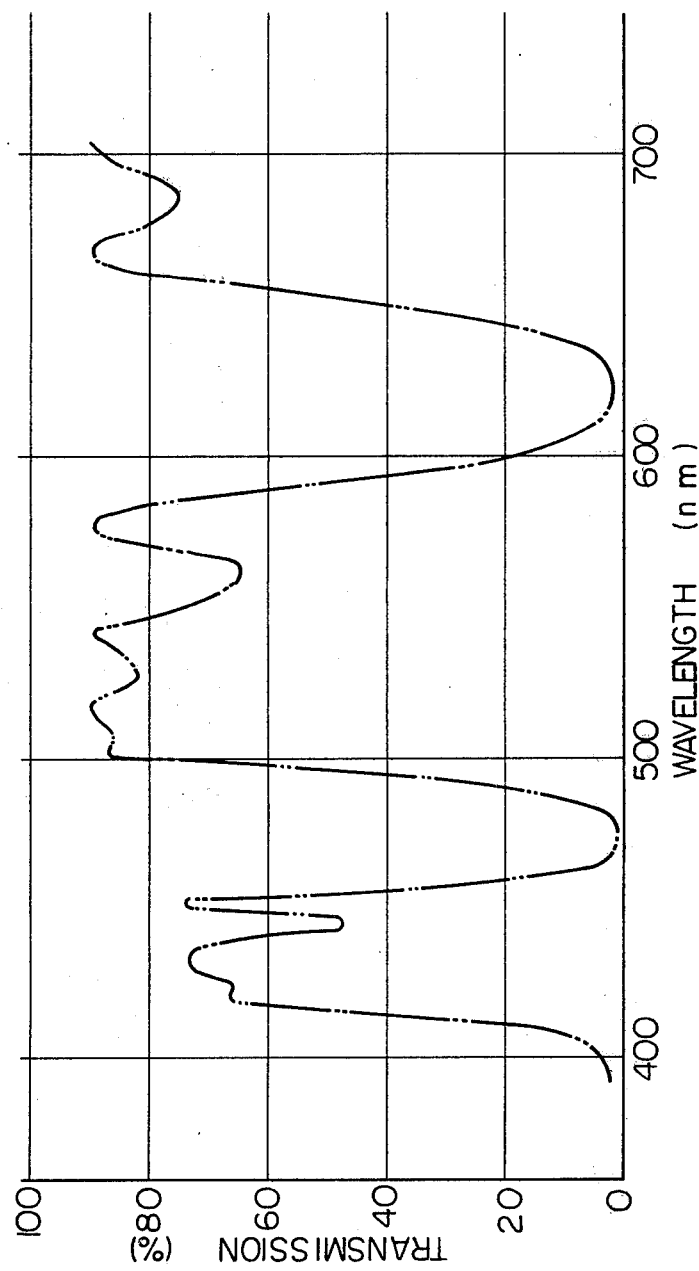
Figure 18:
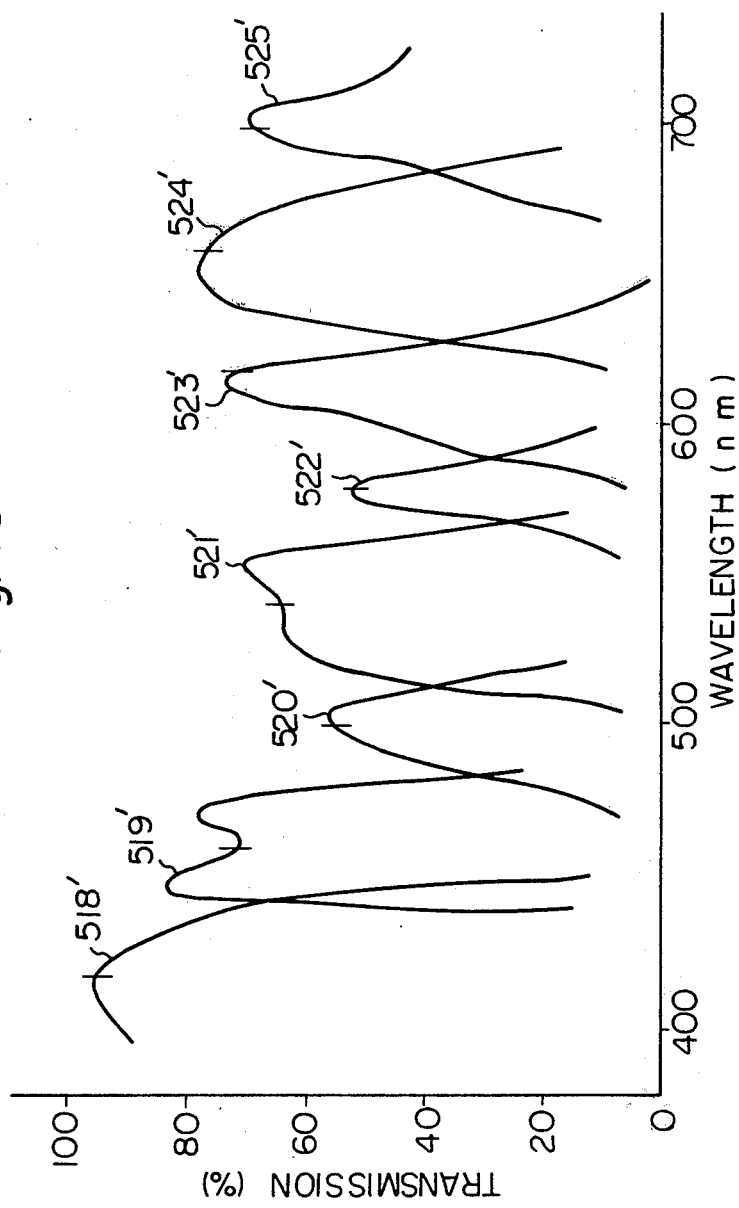
Figure 19:
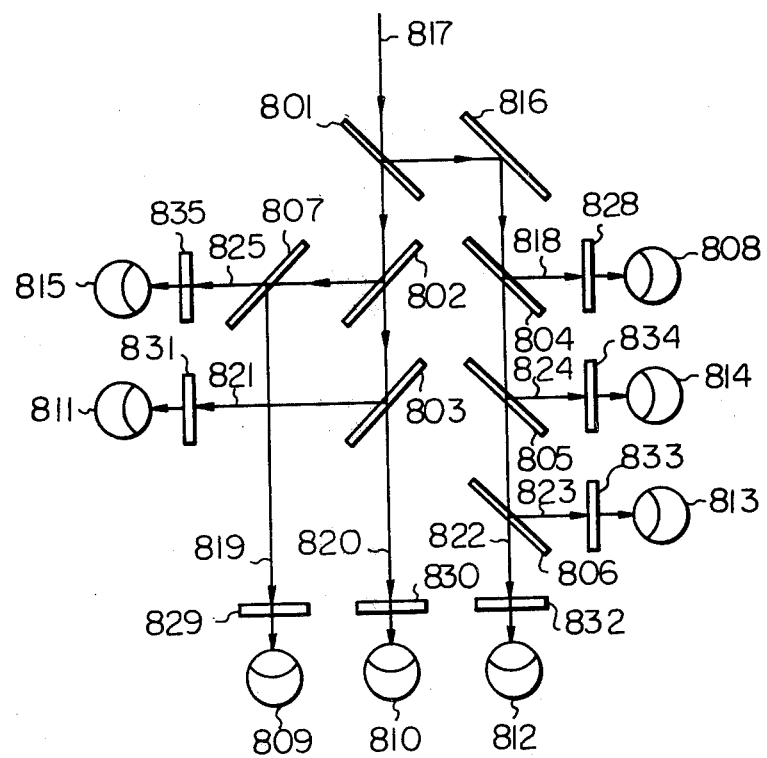
Figure 20:
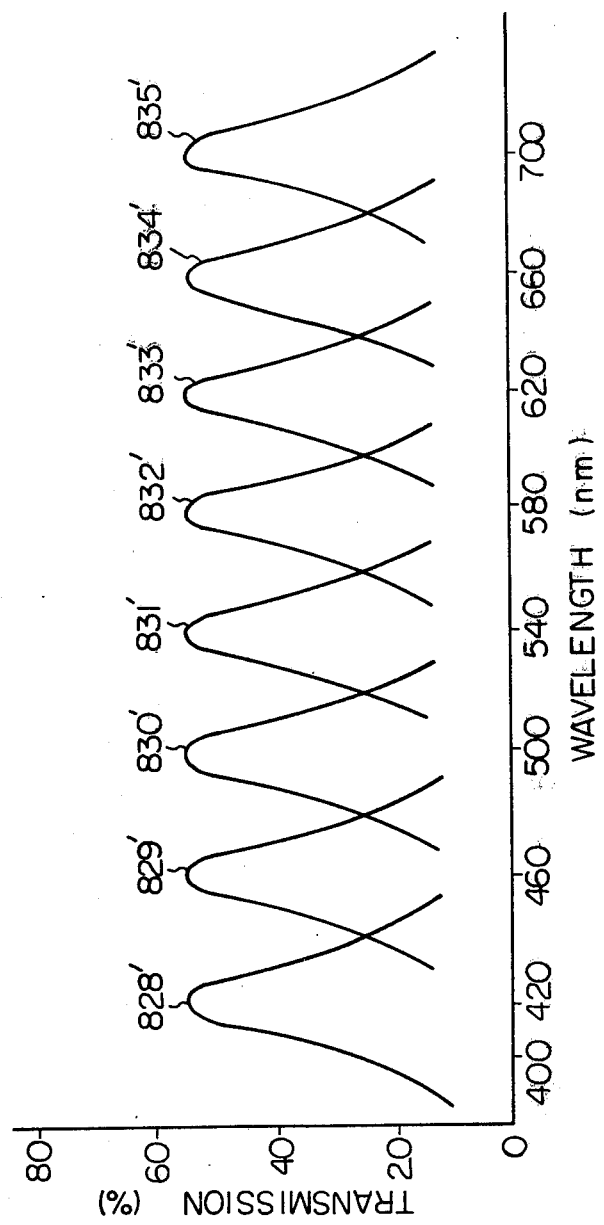

FIGS. 12–14 each shows optical characteristics of a dichroic mirror used in a third preferred embodiment of the present invention;

FIG. 15 illustrates optical characteristics of a dichroic mirror for better understanding of the third preferred embodiment;

FIGS. 16–18 illustrate the third preferred embodiment;

FIGS. 19–20 illustrate a modification of the third preferred embodiment; and

FIGS. 21–24 illustrate another modification of the third preferred embodiment.

Figure 1A:
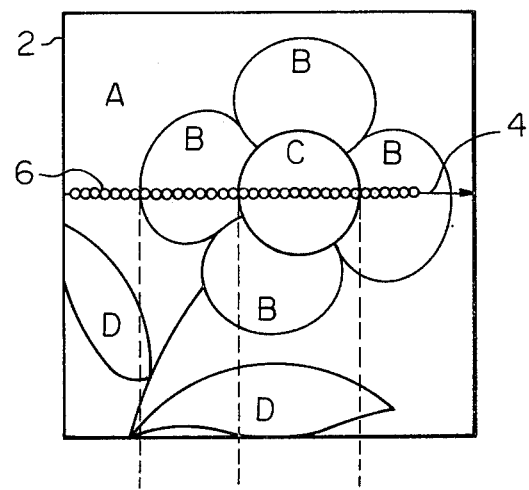
FIGS. 1a and 1b are a schematic illustration for describing prior art.
Figure 1B:
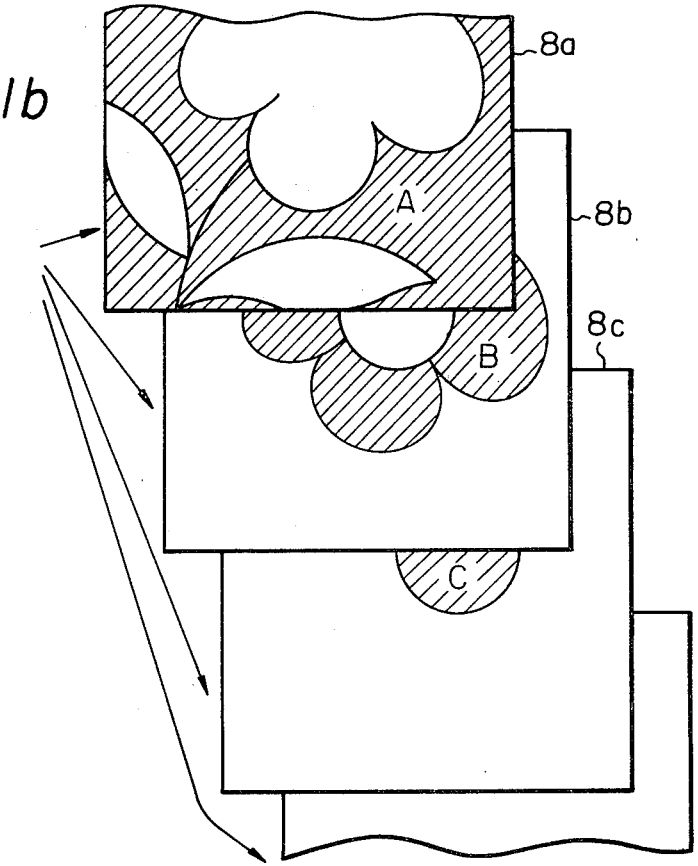

Reference is now made to FIGS. 2a through 2c inclusive, which illustrate a principle of a first preferred embodiment of the present invention. Like the scanning in FIG. 1a, a suitable scanning means (not shown) scans across the color subject copy 2 along the line 4 with the arrow. Light beams carrying color information, which are reflected from the surface of the subject copy 2, are processed in a color analyzing or separating means (not shown) as will be referred to later, and serve to produce a train of pulses as shown in FIG. 2b. Each of the pulses in FIG. 2b represents a color border between two different colors. Therefore, if several picture elements which follow one of the pulses in FIG. 2b represent a specified color, it is understood that the subsequent picture elements, until the next pulse appears, will represent the same color. In this case, if the determination of a color is performed by majority with respect to the several picture elements, its reliability increases.

It is therefore understood that, according to the above principle, the processing time could be considerably reduced in that most of the picture elements between the adjacent color borders can be neglected with respect to the color determinations thereof.

Figure 3A:
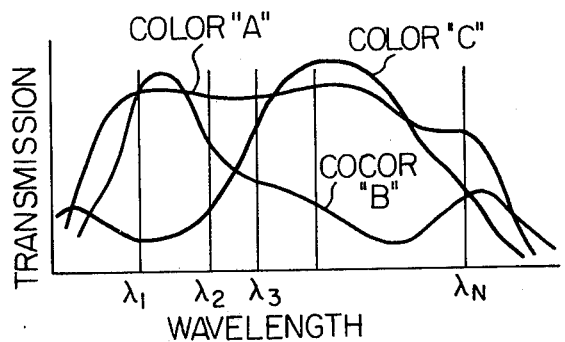
Figure 3B:
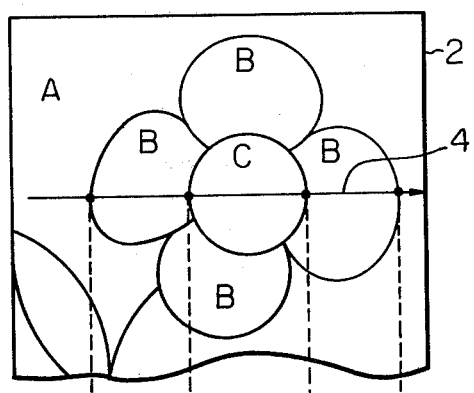
Figure 3C:
Figure 3D:
Figure 3E:
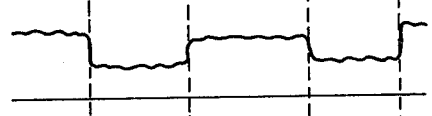
Figure 3F:
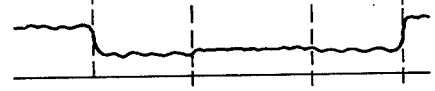

Reference is now made to FIGS. 3a through 3f inclusive, which illustrate in more detail a principle of the first preferred embodiment. FIG. 3a shows three spectral characteristics of the colors "A", "B", and "C". On the other hand, FIG. 3b shows the color subject copy 2 which is scanned along the line 4 with the arrow. FIGS. 3c through 3f show waveforms of electrical signals from a suitable photoelectric converter (not shown) at wavelengths $\lambda_1$, $\lambda_2$, $\lambda_3$, and $\lambda_n$, respectively, when the color subject copy 2 is scanned along the line 4. In FIG. 3c, an output difference between the colors "A" and "B" is equal to about zero, but, as seen from FIG. 3e, the output difference is large to a considerable extent. On the other hand, in FIG. 3f, an output difference between the colors "B" and "C" is negligible, but, in FIG. 3c, this output difference is remarkable. Therefore, it is concluded that if the light beams reflected from the subject copy 2 are analyzed with respect to their spectra at various different wavelengths, various color borders can be easily detected.

The electrical signals of FIGS. 3c through 3f are then differentiated, and the waveforms of the differentiated signals are shown in FIGS. 4a through 4d, respectively. Next, the differentiated signals of FIGS. 4a–4d are wave shaped in such a manner as to take absolute values, the waveform of which are shown in FIGS. 4e through 4h, respectively. The signals thus wave shaped are then added in their magnitudes and the waveform of the added signal is shown in FIG. 4i. Then, a train of pulses are generated when the added magnitudes each exceeds a threshold value, and the resultant waveform is shown in FIG. 4j. Consequently, it is understood that (1) each of the pulses represents a color border between two different colors, and (2) even if a magnitude difference of the electrical signal at a given wavelength is negligible or small as in FIGS. 3c and 3f, the color border can be clearly detected by adding the magnitudes of the signals at a plurality of wavelengths.

Reference is now made to FIGS. 5a through 5d inclusive, which illustrate how the color information signal is stored in a suitable recording means 10 such as a magnetic tape, disc, or drum. The waveform in FIG. 5a corresponds to that in FIGS. 4j. A pulse $P_1$ in FIG. 5a is used to indicate a position of a border between the two colors "A" and "B", and is stored as an address data $Q_1$ which is a function of time. A gate pulse $R_1$ with a pulse width $W_2$ follows the pulse $P_1$ after an interval $W_1$, and contains, in this case, information of three picture elements, each of which represents the color "B". The time duration $W_1$ is for avoiding a malfunction of the discrimination of color of a picture element due to overlapped different colors in the vicinity of the border. The information of the three picture elements is stored in the recording means 10 as $C_B$ as shown in FIG. 5c. The three data points "$C_B$" (FIG. 5c) are abridged to be one data point "$C_B$" which is stored in one memory unit as shown in FIG. 5d. This method serves for compactly recording the information in question. Summing up, information of a position of the color border and a color between two color borders can be stored as only two data units. Similarly, a pulse $P_2$ is used to indicate a position of a color border between the two different colors "B" and "C", and is stored as an address data $Q_2$ which is a function of time. A gate pulse $R_2$ follows the pulse $P_2$ with the interval $W_1$, and contains information of three picture elments, each of which represents the color "C". Then, the information of the three picture elements is stored in the recording means 10 as shown in FIG. 5c, and finally is rearranged in the recording means 10 together with the address data $Q_2$ in the same manner as previously referred to. Subsequent cases of encoding change in color boundary in FIGS. 5a through 5d have been omitted for brevity. When, for example, the three data points "$C_B$" in FIGS. 5c are abridged into one data point as in FIG. 5d, more precise data transfer can be achieved, if decided by majority in that fault data is able to be cancelled.

In the above, it was assumed that the color subject copy 2 does not involve, for example, nonuniformity of painting, uneven surface, or scratches, so that electrical noises are not generated therefrom. However, in practice, such noise sources are often found in a color subject copy. As a consequence, in the following, there will be discussed in connection with FIGS. 6a-6e a case where such undesirable noise sources are involved in the color subject copy 2', wherein the same parts as those in FIGS. 5a through 5d will be omitted for brevity. The noise sources $N_1$ of FIG. 6a and $N_2$ cause noise pulses $N_{P1}$ and $N_{P2}$ as shown in FIG. 6b, resulting in the fact that fault data $N_{C1}$ and $N_{C2}$ are recorded on the recording means 10 as shown in FIG. 6c, wherein data $Q'_1$ and $Q'_2$ denote fault addresses representing positions of the noise sources $N_1$ and $N_2$, respectively, and wherein data $C_N$, $C_B$, and $C_C$ represent fault color and colors "B" and "C", respectively. Each of the data, which is recorded on the recording means 10, is processed in the same manner as previously referred to in connection with FIGS. 5c and 5d, and is then rearranged in the recording means 10 as shown in FIG. 6d after the abridgement by means of the decision by majority. However, since fault data $N_{C3}$ and $N_{C4}$ are involved in the data recorded on the recording means 10, they should be removed. To this end, the following steps are taken: (1) if two adjacent color data are equal, the latter color data is cancelled together with its associated address data, and (2) if the two adjacent color data are different from each other, the following color data is rearranged on the recording means 10 as shown in FIG. 6e. It is understood from the above that, according to this embodiment, undesirable data due to noise sources can be easily removed.

Figure 7:
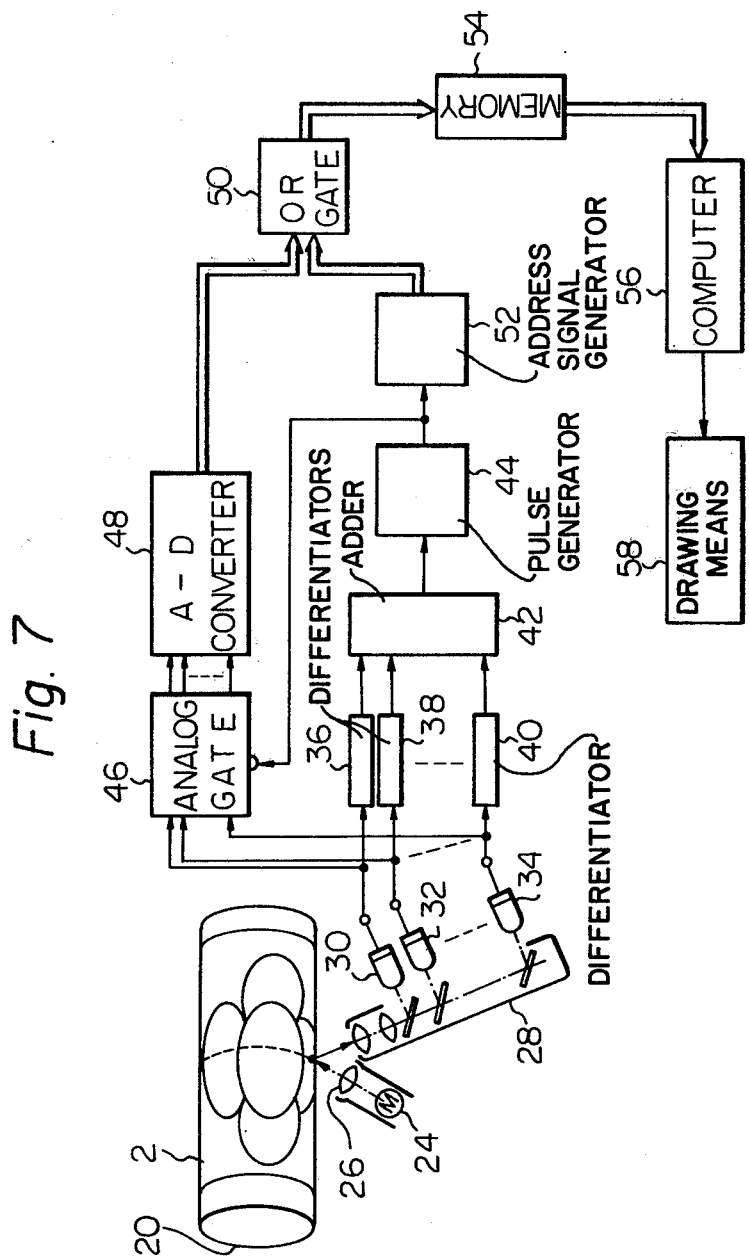
FIG. 7 illustrates a system of the first preferred embodiment.

Reference is now made to FIG. 7, which illustrates an example of a system for the preceding methods. The color subject copy 2 is wrapped on a suitable drum 20, and is scanned by a scanner which includes conveniently a light source 24, an optical system 26, and means (not shown) for scanning the subject copy 2. Reflected light beams enter directly a color separator 28 comprising a plurality of color filters (no numerals). The color separator 28 sends a plurality of separated color light beams to a plurality of photoelectric converters 30, 32, and 34. Electrical signals from the photoelectric converters are then fed to differentiators 36, 38, and 40, and are differentiated therein. A unit 42 receives the differentiated signals from the differentiators, treating such that the received signals take absolute values, and the magnitudes of the signals are added. The added signals are fed to a next stage. viz., a circuit 44 wherein a train of pulses are generated when each of the magnitudes of the added signals is over the threshold value. The pulses from the circuit 44 are then fed to an analog gate 46 to which the electrical signals from the photoelectric converters 30-34 are also applied. The gate 46 allows a plurality of signals from the converters to transfer them to an A-D converter 48 as shown in FIG. 5b. The A-D converter 48 converts the analog signals from the gate 46 into digital ones which are then applied to an OR gate 50. On the other hand, the pulses from the circuit 44 are applied to a circuit 52 to which picture element clock pulses are fed and which generates the address signals of digital form. The address signals are then applied to the OR gate 50. Thus, the address and color data are stored in a memory 54 such as a magnetic tape, drum, or disc, etc. The data in the memory 54 is then applied to and processed in a suitable computer 56, and is transferred to a pattern drawing means 58 such as a printing scanner, a plotter, or a cathode-ray tube, etc. The computer 56, if necessary, removes the fault data as in FIGS. 6c and 6d.

Figure 8:
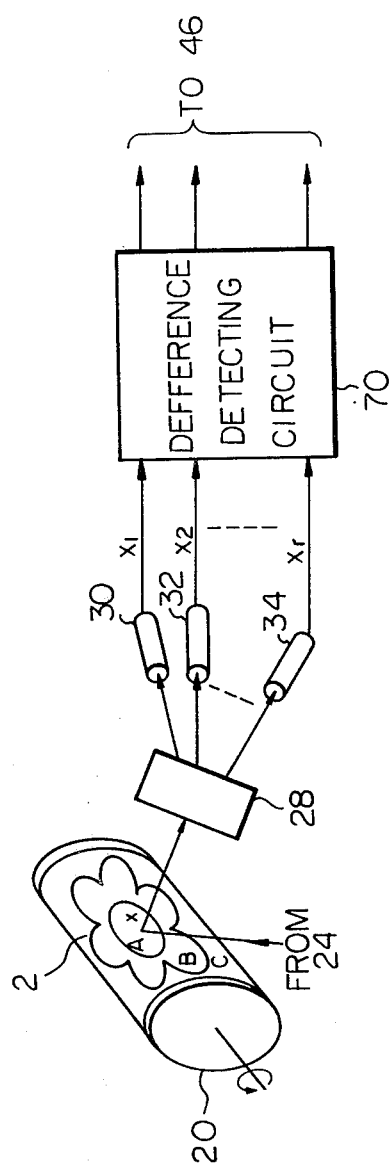
FIG. 8 is an illustration with which a second preferred embodiment of the present invention is concerned.

In FIG. 8, there is illustrated a principle of a second preferred embodiment of the present invention. The same elements as those in FIG. 7 will be omitted for brevity. Electrical signals $x_1, x_2, \ldots, x_r$ from the photoelectric converters 30-34, which represent different spectra from one another, are fed to a difference detecting circuit 70. The circuit 70, then, compares the magnitude differences between adjacent signals of $x_1, x_2, \ldots, x_r$ with predetermined reference values and also adds the magnitudes of received signals. The output of the circuit 70 is fed to the analog gate 46.

It is therefore an object of the second preferred embodiment of the present invention to remove this defect.

Figure 9:
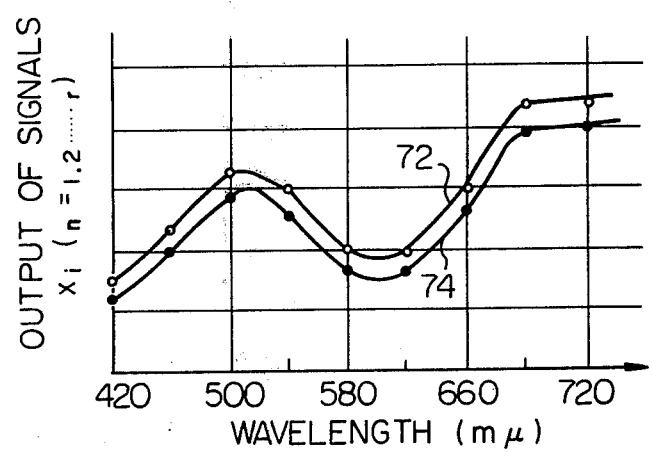
FIGS. 9 and 10 illustrate a method of the second preferred embodiment.
Figure 10:
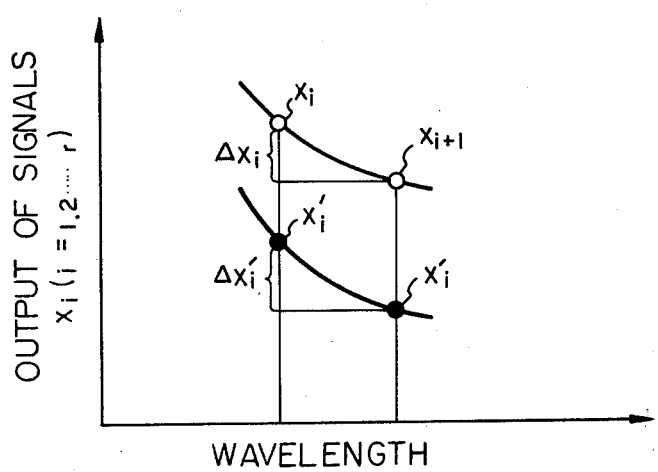

A principle of this embodiment is further illustrated in FIG. 9 wherein reference numbers 72 and 74 denote plotted curves indicating output magnitudes of the signals from the photoelectrical converters when the signal involves noise and no noise, respectively. The noise results from nonuniformity of painting. As seen from FIG. 9, magnitude differences between two curves 72 and 74 are substantially constant over a range of wavelength 420-720 mili-microns. This phenomenon has been noted by the inventers of the present invention after checking more than 4,000 picture elements. FIG. 10 shows an enlargement of a portion of the curves in FIG. 9. As shown, a magnitude difference $\Delta x_i$ between signals $x_i$ and $x_{i+1}$ ($n=1, 2, \ldots, r$) on the curve 72 is approximately equal to another magnitude difference $\Delta x_i'$ between signals $x_i'$ and $x_{i+1}'$ on the curve 74. It is therefore understood that, if the magnitude differences between adjacent signals are applied to the circuit 70 of FIG. 8, the noise can be considerably reduced. In this case, if the magnitude difference $\Delta x_i$ is equal to or resembles that of another plotted curve (not shown) with respect to another color with no noise source, then, two colors are discriminated by comparing a magnitude sum of the signals of one color with that of the other.

Figure 11:
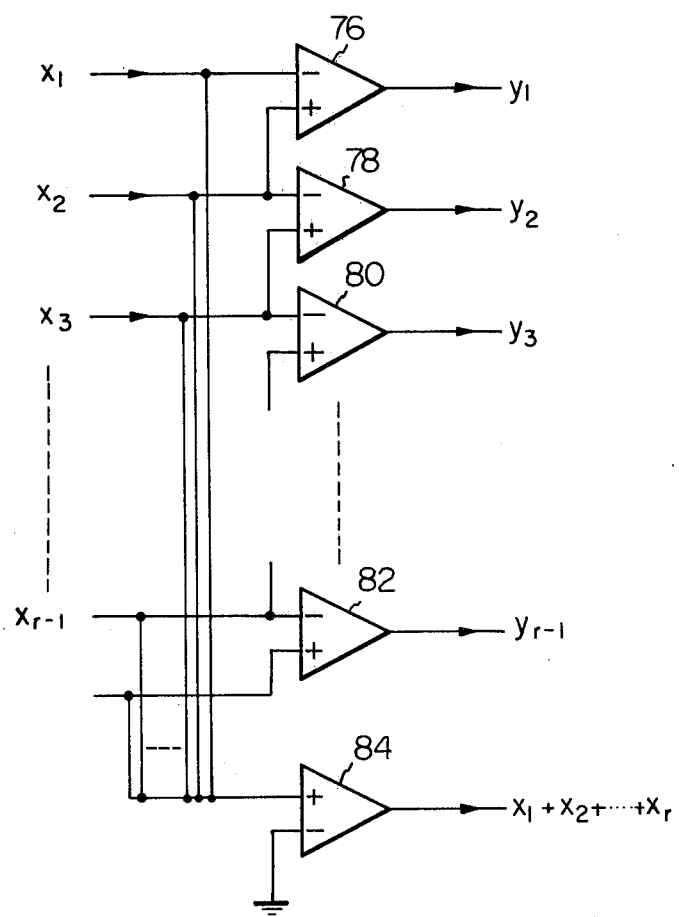
FIG. 11 illustrates a system of the second preferred embodiment.

FIG. 11 schematically illustrates an example of a system for the second preferred embodiment. The signals $x_1, x_2, \ldots, x_r$ are fed to a plurality of operational amplifiers 76, 78, 80, and 82. These amplifiers generate signals $y_1, y_2, \ldots, y_{r-1}$ each of which represents the magnitude difference and is applied to the analog gate 46. The signals $x_1, x_2, \ldots, x_r$ are also applied to an operational amplifier 84 which adds the magnitudes of the signals for the purpose of determining lightness and discriminating the above mentioned two signals with like magnitude differences.

According to the experiment by the inventors, fault color discrimination is reduced to one third by using the second preferred embodiment.

In the following, a third preferred embodiment of the present invention will be described in connection with FIGS. 12-24. This embodiment is concerned with an optical filter including a plurality of dichroic mirrors each of which has narrow band transmission characteristics, and is very useful when employed in the color separator 28 in FIGS. 7 and 8. FIGS. 12, 13, and 14 show transmission characteristic of three dichroic mirrors with dielectric multi-coated layers as a function of normalized wavelength ratio $\omega$. The differences between the transmission characteristics of FIGS. 12-14 result from differences of thickness of each of the coated layers and also differences of the number of the layers. These dichroic mirrors each has high and low refraction layers (for example, ZnS and MgF$_2$, respectively) alternately superimposed on a transparent substrate by, for example, a vaporizing technique. As is known in the art, the absorption of light beams passing through dielectric multi-layers is negligible so that a sum of the transmission and the reflection rates is substantially equal to unity. This means that a dichroic mirror with very effective optical characteristics can be obtained. Meanwhile, a main or central resonant wavelength ($\lambda_o$) of the dichroic mirror is controlled by thickness of coated layers, and a transmission characteristic is in turn controlled by the number of the coated layers. As a result, the resonant wavelength of a dichroic mirror, or in other words, the optical characteristic of a dichroic mirror, can be changed without change of the number of the coated layers. By way of example, FIG. 15 shows two characteristic curves 80 and 82 having, respectively, different resonant wavelengths of 600 and 500 nm, but the same number of the layers.

FIGS. 16, 17, and 18 illustrate a first example of the third preferred embodiment. FIG. 16 is a schematic illustration of an arrangement of the example which includes seven dichroic mirrors 501-507 and eight photoelectrical converters 508-515 in order to obtain, from a white light 517, eight light beams 518-525 each having different spectra from one another. As shown, all the dichroic mirrors are positioned at an angle 45° with respect to the incoming white light 517. The dichroic mirrors 501, 502, 503, 505, 506 have central wavelengths 420, 560, 540, 660, and 620 nm, respectively, and, each of these mirrors has the same number of the layers as a mirror whose optical characteristic has been shown in FIG. 14. On the other hand, the dichroic mirrors 504 and 507 have their central wavelengths 420 and 460 nm, respectively, and, each of these mirrors has the same number of layers as a mirror whose optical characteristic has been shown in FIG. 13. FIGS. 17a-17g show seven transmission curves 501'-507' as a function of wavelength of the seven dichroic mirrors 501'-507', respectively. As a result, the light beam 518 has been reflected by the two mirrors 501 and 504, so that variations of transmission (percent) with wavelength with respect to light beam 518 is as shown by reference numeral 518' in FIG. 18. On the other hand, the mirror 501 selectively allows the white light 517 to pass therethrough and then the mirrors 502 and 507 selectively reflect the light beam from the mirror 501. Therefore, the resultant light beam 519 has a spectrum characteristic as shown by reference numeral 519' in FIG. 18. Similarly, other variations of transmission with wavelength with respect to light beams 520-525 are shown by reference numrals 519'14 525' in FIG. 18, respectively.

Reference is now made to a second example of the third preferred embodiment, which is compactly arranged in comparison with the first example of FIG. 16. Dichroic mirrors 801-807 of FIG. 19 correspond to the mirrors 501-507, and photoelectric converters 808-815 of the converters 508-515, and light beams 817-825 to the light beams 517-525. A reference numeral 816 denotes a total reflection mirror which changes a light beam direction and serves for making this arrangement compact. As shown, one of eight optical interference filters 828-835 is each positioned between the dichroic mirror and the converter in order to remove the overlaps of the characteristic curves. The filters 828, 829, 830, 831, 832, 833, 834, and 835 have central wavelengths 420, 460, 500, 540, 580, 620, 660, and 700, respectively, and each of the filters have a half value width of ±20 nm, as shown in FIG. 20. Reference numerals 828'-835' show optical characteristics of the interference filters 828-835, respectively. By means of the interference filters 828-835, although not shown, optical characteristics of the light beams 818-825 are improved with respect to transmission and reflection bands and also separation. In the above, the interference filters 828-835 can be omitted in the case where accurate optical separation is not necessarily required. A system according to this second example is very practical and useful in that the photoelectric converters 808-815 are regularly and compactly arranged in a U-shape so that this system is readily constructed and adjustable. Furthermore, such a compactly arranged color analyzer is very suitable for being mounted on a moving scanner as, for example, to be used in the system of FIG. 7 although not shown in the drawing.

Figure 21:
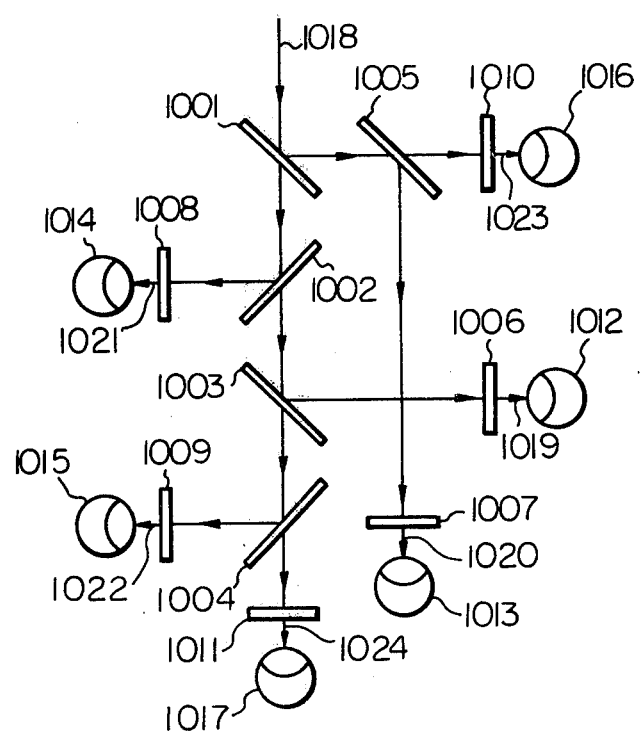
Figure 22:
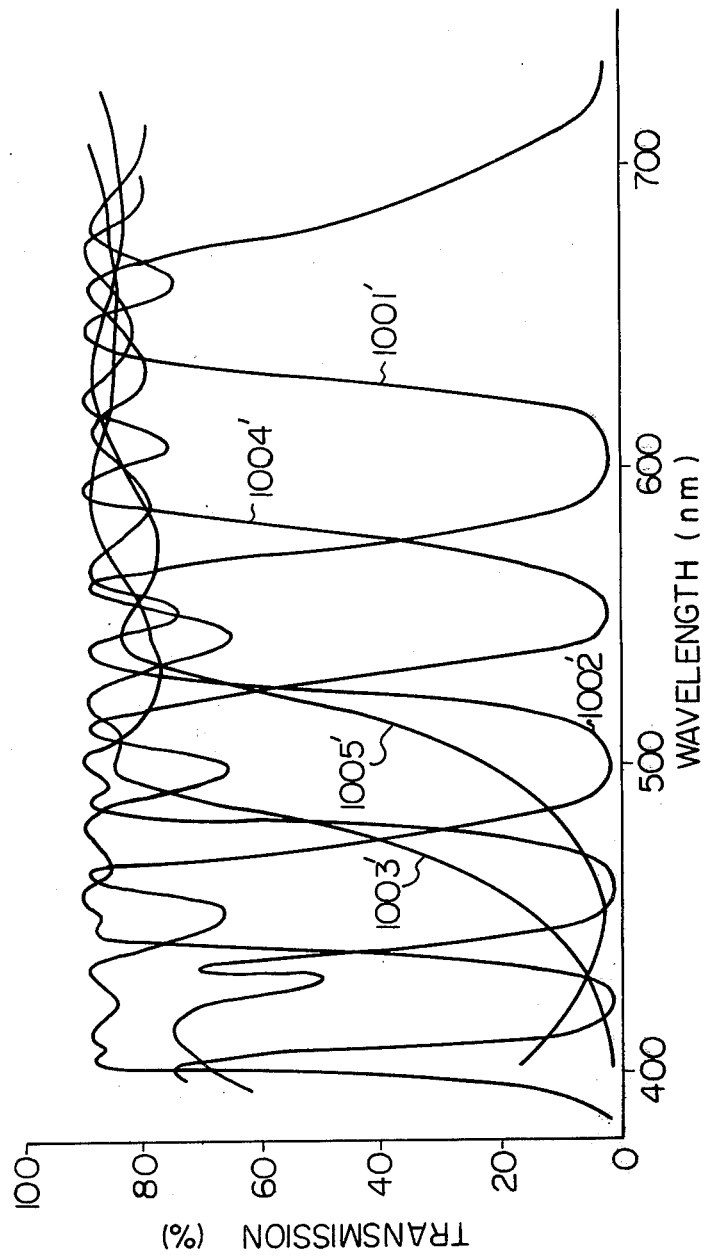
Figure 23:
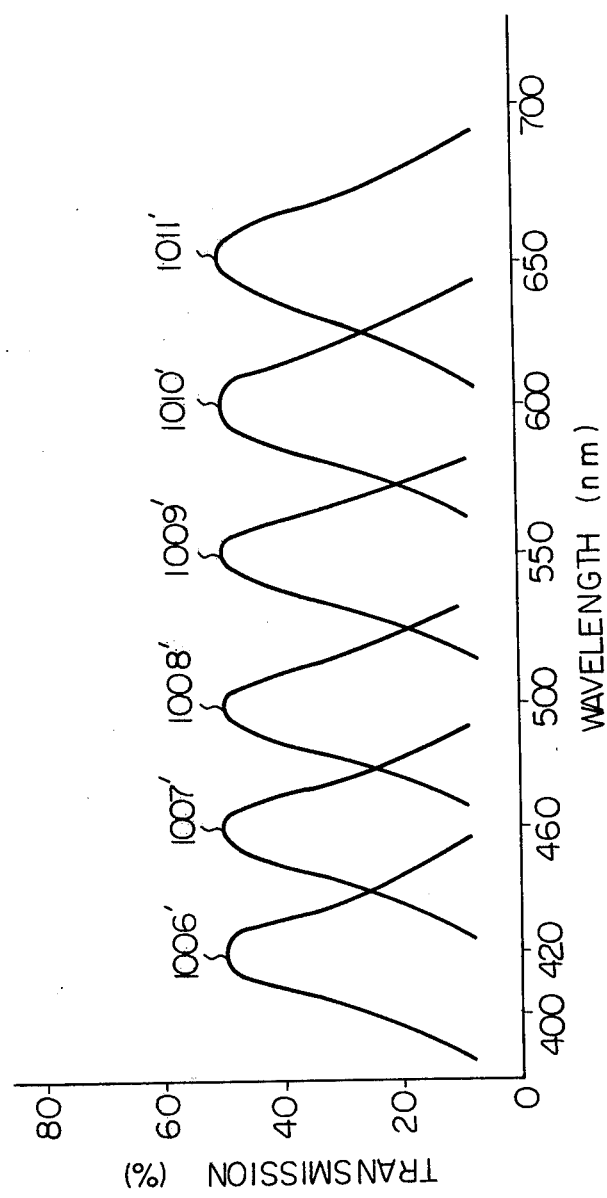
Figure 24:
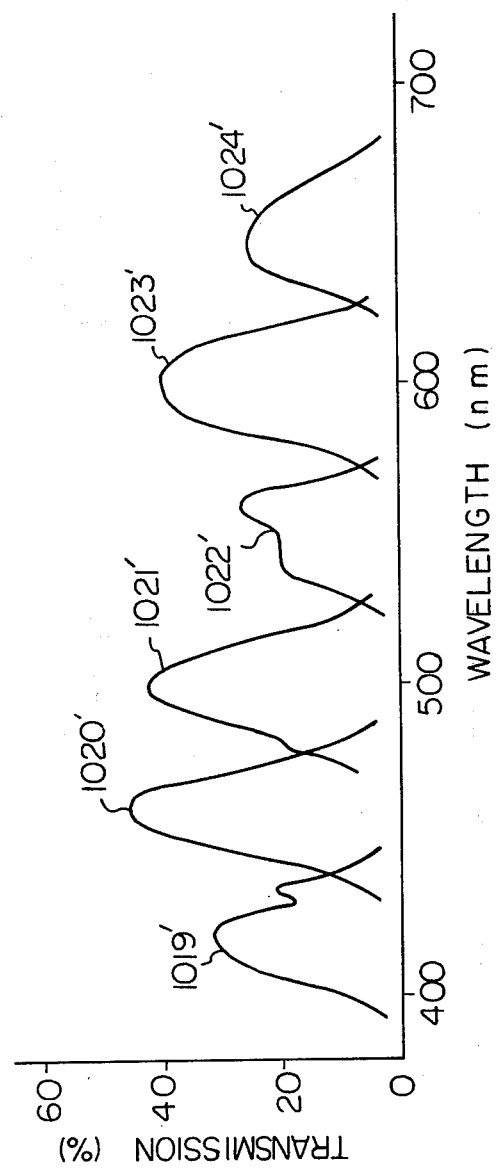

FIG. 21 illustrates another example of the third preferred embodiment of the present invention. In brief, the system of FIG. 21 separates a collimated white light 1018 into six bands by combining five dichroic mirrors 1001-1005. The dichroic mirrors 1001, 1002, and 1004 each has an optical characteristic similar to that in FIG. 14, and these three mirrors have central wavelengths ($\lambda_o$) 600, 500, and 550 nm, respectively. On the other hand, the dichroic mirrors 1003 and 1005 have central wavelengths 420 and 460 nm, respectively, and each of these two mirrors have an optical characteristic similar to that in FIG. 13. Optical interference filters 1006-1011 are provided for regulating optical bands of light beams 1019-1024. The filters 1006, 1007, 1008, 1009, 1010, and 1011 have central wavelengths 420, 460, 500, 550, 600, and 650 nm, respectively, and have optical characteristics denoted by reference numerals 1008', 1009', 1010', and 1011', respectively, in FIG. 23. FIG. 22 shows optical characteristics of the filters 1001-1005 having reference numerals 1001'-1005', respectively. In FIG. 21, the collimated white light 1018 is spectrally separated, entering, through the interference filters 1006-1011, six photoelectric converters 1012-1017, respectively. The spectrum characteristics of the light beams 1019-1024 of FIG. 21 are illustrated by reference numerals 1019'-1024' of FIG. 24, respectively.

In the above, a filter whose optical characteristic is similar to that in FIG. 12 is not used in the preceding three examples, however, it goes without saying that such a filter can also be used.

It is understood from foregoing that the present invention is practical and useful for color printing, textile printing, or in a facsimile system.

What is claimed is:

1. A method of color separation of colored patterns on a subject copy, which comprises the following steps:
   scanning the subject copy by means of light beams;
   detecting color borders each of which is between two consecutive different colored patterns, scanned by said light beams; and
   discriminating a color of a predetermined scanned portion following each of the detected color borders and determining the sensed color as a color between the detected and adjacent color borders.

2. A method as claimed in claim 1, wherein the step of detecting comprises:
   separating the light beams reflected from the subject copy into a plurality of spectra;
   converting the spectra into corresponding electrical signals;
   differentiating the electrical signals;
   taking absolute values of each of the differentiated electrical signals;
   adding the magnitude of the absolute values; and
   generating a pulse every time the added magnitude exceeds a predetermined level, which pulse indicates the color border.

3. A system for color separation of colored patterns on a subject copy, which comprises:
   first means for scanning the subject copy by means of light beams;
   second means for detecting color borders each of which is between two consecutive different colored patterns, scanned by said light beams; and
   third means for discriminating a color of a predetermined scanned portion following each of the detected color borders and determining the sensed color as a color between the detected and adjacent color borders.

4. A system as claimed in claim 3, wherein the second means comprises:
   fourth means for separating the light beams reflected from the subject copy into a plurality of spectra;
   fifth means for receiving the reflected light beams and converting the spectra into corresponding electrical signals;
   sixth means for receiving the electrical signal and differentiating the same, the sixth means being connected to the fifth means;
   seventh means for taking absolute values of each of the differentiated electrical signals and generating a signal representative thereof, which means is connected to the sixth means;
   eighth means for adding the magnitudes of the absolute values and generating a signal representative of the added magnitude; and
   means for generating a pulse every time the added magnitude exceeds a predetermined level, which pulse indicate the color border.

5. A system as claimed in claim 4, further comprising:
   an analog gate connected to the fifth means and allowing the electrical signals to pass therethrough for a predetermined time duration;
   an A-D converter connected to the analog gate, converting the electrical signals from the analog gate into digital form; and
   an OR gate connected to both of the A-D converter and the eighth means.

6. A system as claimed in claim 5, further comprising:
   an adder interposed between the fifth means and the analog gate, adding the magnitudes of the electrical signals, and applying the added signal to the analog gate; and
   a plurality of subtractors each of which is interposed between the fifth means and the analog gate and generates a signal representative of a magnitude difference between two electrical signals therefrom.

7. A system as claimed in claim 4, wherein the fourth means comprises: a plurality of optical interference filters each provided with multi-coated layers, at least one of the filters having a main transmitting range and sub-transmitting ranges, tne sub-transmitting range being at both sides or one side of the former, and the filters being arranged in such a manner as to separate the light beams into a plurality of light paths by transmitting and reflecting the light beams and to selectively allow the light beams according to spectra thereof.

8. A system as claimed in claim 7, further comprising a plurality of optical interference filters each of which is provided in the light path and after each of the first-mentioned filters for regulating wavelength width.

* * * * *